United States Patent [19]
Lustig et al.

[11] Patent Number: 4,828,891
[45] Date of Patent: May 9, 1989

[54] FOUR-LAYER PUNCTURE RESISTANT FILM

[75] Inventors: Stanley Lustig, Park Forest; Jeffrey M. Schuetz, Woodridge; Stephen J. Vicik, Darien, all of Ill.

[73] Assignee: Viskase Corporation, Chicago, Ill.

[21] Appl. No.: 9,980

[22] Filed: Feb. 2, 1987

[51] Int. Cl.$^4$ ............................................... B27N 5/02
[52] U.S. Cl. .................... 428/35.4; 428/428; 428/349; 428/340; 428/500; 428/516; 428/518; 428/520; 428/910
[58] Field of Search .............. 428/500, 516, 518, 520, 428/910, 35, 340, 349; 264/244.11

[56] References Cited

U.S. PATENT DOCUMENTS

| | | | |
|---|---|---|---|
| 4,296,156 | 10/1981 | Lustig et al. | 428/35 |
| 4,348,437 | 9/1982 | Lustig et al. | 428/35 |
| 4,456,646 | 6/1984 | Nishimoto et al. | 428/216 |
| 4,567,090 | 1/1986 | Ohya et al. | 428/35 |

FOREIGN PATENT DOCUMENTS

202814 11/1986 European Pat. Off.

OTHER PUBLICATIONS

Modern Plastics, Aug. 1982, 2 pages.
Packaging, Jul. 1982, pp. 16, 18, 45.
Plastics World, Dec. 1982, pp. 40–43.

*Primary Examiner*—Edith Buffalow
*Attorney, Agent, or Firm*—Cedric M. Richeson

[57] ABSTRACT

A heat-shrinkable multilayer film suitable for use in fabricating bags for packaging primal and subprimal meat cuts. The multilayer film has a first outer layer of an ethylene-vinyl acetate copolymer, a first core layer of an oxygen barrier material, a second core layer of a polyurethane, and a second outer layer of a linear low density polyethylene. The multilayer film is preferably made by coextrusion of the layers, and then it is biaxially stretched. After biaxial stretching, the multilayer film is preferably irradiated to a dosage level of between 3 megarads and 8 megarads, and is then heat-sealed in the form of a bag. The bag has improved toughness properties.

62 Claims, No Drawings

FOUR-LAYER PUNCTURE RESISTANT FILM

FIELD OF THE INVENTION

This invention relates to a puncture resistant film suitable for use in the manufacture of heat-sealable bags for packaging primal and subprimal meat cuts. In particular, this invention relates to an irradiated four-layer film, wherein a first outer layer of the film comprises an ethylenevinyl acetate copolymer, a first core layer comprises a barrier film, a second core layer comprises a polyurethane, and a second outer layer comprises a linear low density polyethylene.

BACKGROUND OF THE INVENTION

Primal and subprimal meat cuts are large cuts of meat. They are smaller than a side of beef, for example, but larger than the ultimate cut that is sold at retail to the consumer. A primal cut comprises the entire section of a side of beef, such as the rib section or the rump roast section, while a subprimal cut comprises only a portion of such a section. Primal and subprimal cuts are prepared at the slaughter house and are then shipped to a retail meat store, or to an institution such as a hospital, hotel or restaurant, where they are butchered into smaller cuts of meat suitable for the individual consumer. When primal and subprimal meat cuts, such as roast or rib sections, are prepared at the slaughter house, they are usually packaged in such a way that air (i.e., oxygen) is prevented from contacting the meat and moisture is prevented from leaving the meat. This is done in order to minimize spoilage and discoloration during shipping and handling. One desirable way to package primal and subprimal meat cuts so as to protect them from contact with air and from moisture loss is to shrink package them with a packaging material that has good oxygen and moisture vapor barrier properties. One such shrink packaging material that has good oxygen and moisture vapor barrier properties is polyvinylidene chloride film. (Polyvinylidene chloride copolymers are commonly referred to as PVDC.) However, while polyvinylidene chloride film has excellent barrier properties, in actual practice, when polyviinylidene chloride is used as a monolayer film, it must be plasticized in order for the film to have adequate abrasion resistance and flexibility at storage temperatures of, for example, 30° to 50° F. Unfortunately, the addition of plasticizer sufficient to provide the requisite low temperature properties to the PVDC monolayer film has a significant adverse effect on the barrier properties of the film. While increasing the thickness of the film from the conventional thickness of 1.5 to 2.0 mils, to 5 mils or more, for instance, would improve the barrier properties of the film, it would be economically undesirable to use a monolayer film of polyvinylidene chloride having a thickness of 5 or more mils. Also, if such thick film were employed, bags made from the film would be difficult to gather and clip closed at the open end.

One approach to the provision of a film having barrier properties which are better than those of the 1.5 to 2.0 mil monolayer polyvinylidene chloride film previously used for shrink packaging primal and subprimal cuts is to employ a multilayer film, one layer of which is polyvinylidene chloride having a minimum amount of plasticizer. The other layer or layers of such multilayer films are selected so as to provide the requisite low temperature properties and abrasion resistance which are lacking in the polyvinylidene chloride layer containing little or no plasticizer. In providing such a film, however, it must be recognized that good oxygen and moisture vapor barrier properties, abrasion resistance, and low temperature properties are not the only requirements for a film that is to be used for shrink packaging primal and subprimal meat cuts. The film must have been biaxially stretched in order to produce shrinkage characteristics sufficient for the film to heat-shrink within a specified range of percentages, e.g., from about 15 to 60 percent at about 90° C., in both the machine and the transverse directions. (Hereinafter, the term "MD" refers to machine direction and the term "TD" refers to transverse direction.) The film must be heat sealable in order to be able to fabricate bags from the film and in order to heat seal the open ends of the fabricated bags after insertion of the meat product. The heat sealed seams of the bags must not pull apart during the heat shrinking operation, and the film must resist puncturing by sharp bone edges during the heat shrinking operation. Also, there must be adequate adhesion between the several layers of the film so that delamination does not occur, either during the heat shrinking operation or during exposure of the film to the relatively high temperatures that may be reached during shipping and storage of the film in the summertime.

Primal and subprimal meat cuts typically have substantial portions of bones remaining in them, and often the bones will protrude above the surface of the meat itself. This can, and usually does, present a problem when evacuating the meat package since sharp bones can puncture the walls of the bag. A puncture of the bag walls will release the vacuum within the shrink packaging on the meat and will thus cause air to migrate into the bag. The puncture thereby causes deterioration of the meat from contact with the oxygen of the air and from the considerable outward leakage of the moisture contained in the meat.

To solve the aforementioned problem, various types of boneguard pads have been used in the prior art during the packaging of primal and subprimal meat cuts. A typical conventional boneguard is a wax-impregnated cloth or plastic pad which is severed from a supply roll and placed by hand over the exposed bone before the meat is inserted into the bag. These pads, which are also known as bone wrap, do not seal to the inner surface of the bag. Other boneguard structures include those such as disclosed in the U.S. Pat. No. 4,136,205 to Quattlebaum, and U.S. Pat. No. 4,267,960 to Lind. However, these boneguard structures have suffered from various limitations, including the relatively high cost of labor and materials involved in placing the boneguard pads properly onto the exposed bone ends. In addition, the boneguard pads often have not adequately protected the bags from the effects of protruding bones, so that bag punctures are still experienced during evacuation and shrinkage of the bags and during shipping of the bagged meat product.

A puncture-resistant primal meat packaging material is disclosed in U.S. Pat. No. 4,296,156 to Lustig et al. The packaging material is a four-layer film comprising a first outer layer of a heat sealable polymer, such as an ethylene-vinyl acetate copolymer, a first core layeer of an oxygen barrier material, such as a polyvinylidene chloride copolymer, a second core layer consisting essentially of an aromatic polyurethane, and a second outer layer of an ethylene-vinyl acetate copolymer.

Another puncture-resistant primal meat packaging material is disclosed in U.S. Pat. No. 4,348,437 to Lustig et al. The packaging material is a three-layer or a four-layer film. The four-layer film comprises a first layer of an ethylene-vinyl acetate copolymer, a second layer of an oxygen barrier material such as a polyvinylidene chloride copolymer or an ethylene vinyl alcohol copolymer, a third layer comprising a blend of a polyurethane and an ethylene-vinyl acetate copolymer, and a fourth layer of an ethylene vinyl acetate copolymer or blends of polypropylene copolymers with other polyolefins.

Although the four-layer puncture resistant primal meat packaging material disclosed in the two U.S. Patents to Lustig et al are improvements over earlier multilayer films, they still require the use of protective bonewrap to provide acceptable loading and shrink tunnel survival rates during the packaging of primal and subprimal meat cuts.

The present invention is based upon the discovery that four-layer films, fully described hereinbelow, comprising a first outer layer (inner surface of the bag) of a heat sealable polymer, such as an ethylene-vinyl acetate copolymer; a first core layer serving as an oxygen and moisture barrier layer; a second core layer comprising a polyurethane; and a second outer layer (outer surface of the bag) comprising linear low density polyethylene copolymer, have excellent bone puncture resistance when employed in the shrink packaging of primal and subprimal meat cuts. Accordingly, this invention provides an improved four-layer film that can be employed to fabricate bags useful for shrink packaging primal and subprimal meat cuts and similar food products.

SUMMARY OF THE INVENTION

In accordance with this invention, there is provided a heat-shrinkable multilayer film suitable for use as a primal meat cut packaging bag exhibiting a high resistance to puncture from sharp bones, and comprising a first outer layer comprising an ethylene-vinyl acetate copolymer, a first core layer comprising a barrier material, a second core layer comprising a polyurethane, and a second outer layer comprising a linear low density polyethylene.

After formation, the four-layer film is biaxially stretched. In a preferred embodiment, it is irradiated to a dosage level of between about 3 megarads, and about 8 megarads. In an alternate embodiment, however, the film is not irradiated. In any event, the films of this invention are preferably fabricated into packaging bags.

DETAILED DESCRIPTION OF THE INVENTION

Pursuant to the instant invention, there is provided a heat-shrinkable, biaxially stretched multilayer film suitable for use in packaging primal and subprimal meat cuts, said film comprising (a) a first outer layer of a heat sealable polymer, such as an ethylene-vinyl acetate copolymer, or a blend of ethylene-vinyl acetate copolymer with another heat-sealable polymer; (b) a first core layer serving as an oxygen barrier, which may, for example, comprise a polyvinylidene chloride copolymer or an ethylene-vinyl alcohol copolymer; (c) a second core layer comprising a polyurethane or a blend of polyurethane and an ethylene-vinyl acetate copolymer; and (d) a second outer layer of a linear low density polyethylene copolymer, or a blend of linear low density polyethylene copolymer and high density polyethylene.

In greater detail, the first outer layer of a heat-sealable polymer may comprise an ethylene-vinyl acetate copolymer having a vinyl acetate content of from about 2 percent to about 12 percent, and preferably, from about 2 percent to about 8 percent, based on the weight of the copolymer, and a melt index of from about 0.1 to about 1.0 decigram per minute. This range for the vinyl acetate content is necessary in order to insure that the multilayer film will have the desired ease of biaxial stretching and the required shrinkage characteristics for the finished multilayer film. This melt index range is necessary because the ethylene vinyl acetate copolymer is difficult to extrude when the melt index is below 0.1, and it is difficult to biaxially stretch when the melt index is above 1.0.

Preferably, the first outer layer comprises a blend of said ethylene-vinyl acetate copolymer and a high density polyethylene having a density of from about 0.94 to about 0.96 gram per cubic centimeter and a melt index of from about 0.1 to about 1.0 decigram per minute. Adding a high density polyethylene to the ethylene-vinyl acetate copolymer increases the high temperature puncture resistance of the film. However, as the level of the high density polyethylene in the blend is increased, the shrinkage property of the film decreases. When the content of high density polyethylene in the first outer layer is increased to greater than 30 weight percent, the shrinkage property of the film becomes unacceptable. Thus, the first outer layer of the multilayer film of this invention preferably comprises said ethylene-vinyl acetate copolymer, and up to about 30 weight percent of said high density polyethylene blended with said ethylene-vinyl acetate copolymer.

The first core layer comprises an oxygen barrieer material selected from the group consisting of (1) a vinylidene chloride-vinyl chloride copolymer having a vinylidene chloride content of from about 65 to about 95 weight percent, and a vinyl chloride content of from about 5 to about 35 weight percent, (2) a vinylidene chloride-methyl acrylate copolymer having a vinylidene chloride content of from about 85 to about 95 weight percent and a methyl acrylate content of from about 5 to about 15 weight percent, and (3) an ethylene-vinyl alcohol copolymer having an ethylene content of from about 28 to about 48 mole percent and a vinyl alcohol content of from about 52 to about 72 mole percent, with a saponification degree of not less than about 96 percent.

The two vinylidene chloride copolymers preferably contain less than 5 weight percent of a plasticizer and, more preferably, less than 4 weight percent, the percentages being based on the weight of the total blend, i.e., including the copolymer and all additives such as the plasticizer, in order to maximize the barrier properties of the film. Conventional plasticizers such as dibutyl sebacate and expoxidized soybean oil may be employed therein. For the ethylene vinyl alcohol copolymers, plasticizers may also be added to the extent required for the specific film application.

More preferably, the vinylidene chloride-vinyl chloride copolymer will contain at least about 65 weight percent, and not more than about 95 weight percent, of polymerized vinylidene chloride because, when the vinylidene chloride content is less than about 65 weight percent, the oxygen and moisture barrier property of the copolymer is diminished. If the vinylidene chloride conteent is more than 95 weight percent, the vinylidene chloride-vinyl chloride copolymer is generally not extrudable.

When the first core layer comprises a vinylidene chloride-methyl acrylate copolymer, the vinylidene chloride content should not exceed about 95 weight percent. This is because, when the vinylidene chloride content is greater than about 95 weight percent, the vinylidene chloride-methyl acrylate copolymer is generally not extrudable. However, the vinylidene chloride content should not be less than about 85 weight percent of the vinylidene chloride-methyl acrylate copolymer in order to maintain the level of methyl acrylate in the copolymer at not greater than 15 weight percent, which is the maximum level of methyl acrylate allowed by the United States Food and Drug Administration for food contact applications.

When the first core layer comprises ethylene vinyl alcohol, the ethylene content of the ethylene-vinyl alcohol copolymer should be at least 28 mole percent, because if it is less than about 28 mole percent the film becomes less flexible and is difficult to biaxially stretch. Also, when the ethylene content of said copolymer is greater than about 48 mole percent, the oxygen barrier property of the barrier film diminishes.

The second core layer of the multilayer film of this invention comprises a polyurethane having a Shore A hardness of from about 75 to about 90 as measured in accordance with the method set forth in ASTM D-2240. The impact strength properties of biaxially stretched multilayer films containing a layer comprising 100% polyurethane degrade with time. The addition of an ethylene-vinyl acetate copolymer to the polyurethane prevents this degradation of film properties. Accordingly, a preferred embodiment of this invention comprises a multilayer film wherein the second core layer is a blend of a polyurethane and up to about 40 weight percent of ethylene-vinyl acetate copolymer. Greater than about 40 weight percent ethylene-vinyl acetate copolymer in said blend likewise causes the impact strength properties of the film to degrade. The ethylene-vinyl acetate copolymer useful in said blend may have a vinyl acetate content of from about 12 percent up to about 50 percent, based on the weight of the copolymer, and a melt index of from about 0.5 to about 40 decigrams per minute.

The second outer layer of the multilayer film of this invention comprises a linear low density polyethylene copolymer instead of the ethylene-vinyl acetate copolymers commonly used in the second outer layers of the prior art mutlilayer films for packaging fresh red meats. It has been found that using a linear low density polyethylene copolymer in the second outer layer of the multilayer film provides the film with an abrasion resistance which is improved over similar films containing outer layers of ethylene-vinyl acetate copolymers, and it also provides loading and shrink tunnel survival rates which are superior to the survival rates of those films containing ethylene-vinyl acetate copolymer outer layers. The linear low density polyethylene of this layer has a melt index of from about 0.5 to about 2.0 decigrams per minute and a density of from about 0.88 to about 0.93 gram per cubic centimeter. When the melt index is below 0.5, the film is difficult to extrude, and resins having a melt index above 2.0 are not film grade resins. Those copolymers having a density in the range of from about 0.88 to about 0.91 are commonly referred to as very low density polyethylene.

In addition, high density polyethylene may be added to the linear low density polyethylene, in order to improve the abrasion resistance of the film. As the level of high density polyethylene added to the second outer layer is increased, the abrasion resistance of the film continues to increase. However, when the level of high density polyethylene is increased to greater than 30 weight percent of the second outer layer blend, the shrinkage property of the film becomes unacceptable. Thus, the amount of high density polyethylene in the blend should not exceed 30 weight percent. The high density polyethylene useful in the second outer layer has a melt index of from about 0.1 to anbout 1.0 decigram per minute, and a density of from about 0.94 to about 0.96 gram per cubic centimeter. Resins having a melt index below 0.1 are not extrudable, and those having a melt index above 1.0 produce films of diminished strength.

The thermoplastic multilayer film of this invention can be produced by known techniques. For example, the multilayer films may be prepared by coextruding the film layers through an annular die to produce a primary tube, and then biaxially stretching the multilayer tubular film in accordance with the conventional "double-bubble" technique disclosed in Pahlke U.S. Pat. No. 3,456,044. Alternatively, the films may be fabricated by extrusion coating, wherein a base tube is extruded and succeeding layers are surface coated on the base tube in a manner such as that disclosed in U.S. Pat. No. 3,741,253 to Brax et al. Also, the multilayer film may be slot cast and biaxially stretched by tentering before the resulting sheet is fabricated into bags. In a preferred embodiment, the multilayer film is irradiated, as discussed hereinafter.

The biaxially stretched thermoplastic multilayer film will preferably have an overall thickness of from about 3 mils to about 4 mils. Films of less than about 3 mils thickness will generally not have the necessary puncture resistance, and films of greater than about 4 mils will be somewhat difficult to gather and clip closed or heat seal on vacuum packaging machines. The first outer layer will preferably have a thickness of from about 1.4 mils to about 1.8 mils; the first core layer will preferably have a thickness of from about 0.25 mil to about 0.45 mil; the second core layer will preferably have a thickness of from about 0.8 mil to about 1.2 mils; and the second outer layer will preferably have a thickness of from about 0.35 mil to about 0.75 mil.

The thickness of the first outer layer is preferably within the aforementioned range in order to obtain good seal strength and acceptable film shrinkage. The thickness of the first core layer is preferably within the aforementioned range in order to provide adequate oxygen and moisture vapor barrier without detracting from toughness properties. The thickness of the second core layer is preferably within the above-indicated range in order to provide the required puncture resistance to the film without being too costly. The thickness of the second outer layer is preferably within the aforementioned range in order to make up the total film thickness and provide the aforementioned improved properties of abrasion resistance and puncture resistance.

It has been discovered that the four layer films of the present invention have improved abrasion resistance and improved toughness, and that these characteristics exist whether or not the inventive films are irradiated. Thus, these films have utility in many packaging applications. When these films are fabricated into bags for the packaging or primal and subprimal meat cuts, however, it is preferred that the films be irradiated. Irradiation improves the heat sealing characteristics of the films and it enhances film toughness.

The irradiation of the invention film may be undertaken before or after the film is biaxially stretched, but it is preferably done after biaxially stretching the film. Using techniques which are well known in the art, the film is irradiated to a dosage level of between about one to about ten megarads, and preferably between about 3 megarads and about 8 megarads. The lower limit of irradiation for any given film composition of this invention is determined by the amount of improvement in heat sealing and toughness properties which is required in order to produce bags suitable for a specific packaging use. On the other hand, the upper limit of radiation dosage for any specific film composition is limited by the amount of film degradation which can be tolerated. Such degradation occurs in some of the layers of the film, thereby causing discoloratin and a loss in the toughness properties of the film.

In another aspect of this invention, bags may be produced from the multilayer films of this invention by any suitable method, such as by adhesive sealing or by heat sealing. For instance, if the film of this invention is produced in the form of a tubular film, bags can be produced therefrom by adhesive sealing or heat sealing one end of a length of the tubular film, or by sealing both ends of the tube end and then slitting one edge to form the bag mouth. If the film of this invention is made in the form of flat sheets, bags can be formed therefrom by sealing three edges of two superimposed sheets of film. When carrying out a heat sealing operation, the surfaces which are heat sealed to each other to form seams are the said first outer layers of the films of this invention. Thus, for example, when forming a bag by heat sealing one edge of a length of tubular film, the inner surface of the tube, i.e., the surface which will be heat sealed to itself, will be the said first outer layer of the film. Accordingly, the first outer layer of the film becomes the inner surface of the bag and the second outer layer of the film becomes the outer surface of the bag.

The invention is further illustrated by the examples which follow. In the following examples, all parts and percentages are by weight, unless otherwise indicated. The following materials were employed in making the multilayer films of the examples.

Ethylene—Vinyl Acetate Copolymers (EVA)

EVA 1—12 weight percent vinyl acetate, 0.25 melt index
EVA 2—15 weight percent vinyl acetate, 0.50 melt index
EVA 3—3 weight percent vinyl acetate, 0.25 melt index
EVA 4—4.5 weight percent vinyl acetate, 0.25 melt index
EVA 5—28 weight percent vinyl acetate, 6.0 melt index High Density Polyethylene (HDPE)

Density—0.953 g/cc
Melt Index—0.15

Polyurethane (PUR)

Density—1.20 g/cc
Shore Hardness—78 Shore A

Surlyn 1601 Ionomer (E.I. du Pont de Nemours and Co.)

10% Methacrylic Acid, 1.2 melt index (an ethylenemethacrylic acid ionic copolymer)

Linear Low Density Polyethylene (LLDPE)

Density—0.920 g/cc
Melt Index—0.75 MI

Polyvinylidene Chloride-Vinyl Chloride Copolymer (PVDC)

84 to 87 weight percent vinylidene chloride.
13 to 16 weight percent vinyl chloride The properties of the ethylene hydrocarbon copolymers and films produced therefrom were determined by the following methods:

Density

ASTM D-1505—Plaque is conditioned for one hour at 100° C. to approach equilbrium crystalinity—reported as gms/cm$^3$.

Melt Index (MI)

ASTM D-1238—Condition E—measured at 190° C.

Tensile Strength and Elongation

ASTM D-882

Shrinkage Values

Obtained by measuring unrestrained shrink at 90° C. for five seconds. Four machine direction (MD) test specimens and four transverse direction (TD) test specimens are cut from a given sample of the film to be tested. The MD specimens are cut to 12 cm. in the machine direction by 1.27 cm. in the transverse direction. The TD specimens are cut to 12 cm. in the transverse direction by 1.27 cm. in the machine direction. Each specimen is marked 10 cm. from a first end and then is completely immersed for 5 seconds in a 90° C. water bath. The distance between the first end of the shrunken specimen and the 10 cm. mark is measured. The difference in the measured distance for the shrunken specimen and the original 10 cm. is multiplied by ten to obtain the percent of shrinkage for the specimen. The shrinkage for the four MD specimens is averaged for the MD shrinkage value of the given film sample, and the shrinkage for the four TD specimens is averaged for the TD shrinkage value.

Hot Water Puncture Values

Obtained by performing the hot water puncture test as follows. Water is heated to 90±1° C. A ⅜ inch round wooden dowel is sharpened on one end to a point about 1/16 inch round and is fastened to a wooden block so that the sharpened point projects 1-½ inches beyond the end of the wooden block. A specimen about 3 inches wide in the transverse direction (TD) and about ten inches long is cut from the test sample material. One end of the specimen is placed on the end of the wooden block opposite the pointed dowel. The specimen is wrapped around the end of the sharpened dowel and back to the wooden block on the opposite side, where it is secured. The film thickness in the area of contact with the sharpened dowel is measured in order to assure that the film specimen thickness is truly representative of the given test sample material. The specimen and pointed dowel are quickly immersed into the hot water and a timer is started. The timer is stopped when the wooden dowel point punctures the film specimen. The test procedure is repeated five more times with new 3 inch wide TD specimens from the given test sample material. The time required for penetration is recorded and then averaged for the six TD specimens. This method was used in obtaining the data in Table I of Example I. For the data in Table II of Example II, a similar method was used except that a ⅜ inch stainless steel rod with a sharp metal point was employed instead of the rounded wooden dowel. The sharp metal point has a conical angle of about 35 degrees.

outer layer). For example, the film structure of Sample No. 5 has a first outer layer comprising 85 wt. % EVA 3 and 15 wt. % HDPE, a first core layer of PVDC, a second core layer of 80 wt. % PUR and 20 wt. % EVA 5, and a second outer layer of LLDPE. For the specific characteristics of EVA 3, HDPE, PVDC, PUR, EVA 5 and LLDPE, refer to the materials listing which has been provided hereinabove.

TABLE I

PROPERTIES OF NON-IRRADIATED FOUR LAYER FILMS CONTAINING A LINEAR LOW DENSITY POLYETHYLENE OUTER LAYER COMPARED TO A STANDARD THREE LAYER FILM AND OTHER FOUR LAYER STRUCTURES

| Sample No. | Film Structure | Gauge (mil) | Shrinkage @ 90° C. (%) MD/TD | Tensile Strength (psi) MD/TD | Elongation At Break (%) MD/TD | Hot Water Puncture (sec) | Loading and Shrink Tunnel Survival (%) |
|---|---|---|---|---|---|---|---|
| 1 | EVA 1/PVDC/EVA 2 (control) | 2.4 | 40/50 | 8000/9000 | 200/190 | 10 | 10 |
| 2 | EVA 3/PVDC/80% PUR &/EVA 2 20% EVA 5 | 3.6 | 33/39 | 6900/6500 | 235/160 | 29 | 45 |
| 3 | EVA 3/PVDC/80% PUR &/SURLYN 20% EVA 5 | 3.6 | 33/41 | 7500/9200 | 215/160 | 23 | 30 |
| 4 | EVA 3/PVDC/80% PUR &/LLDPE 20% EVA 5 | 3.6 | 29/35 | 7100/8000 | 240/165 | 28 | 80 |
| 5 | 85% EVA 3 &/PVDC/80% PUR & /LLDPE 15% HDPE          20% EVA 5 | 3.6 | 27/34 | 7600/8200 | 240/180 | 37 | 80 |

Loading and Shrink Tunnel Survival Test

Test films were fabricated into bags which were 18 in. wide×32 in. long. Subprimal meat cuts of Number 107 beef ribs without boneguard pads were loaded into the bags using a conventional high speed bag loader. Air was then removed from the packages and the bags were sealed at the open end with a metal clip using a conventional vacuum chamber. The bags were then conveyed through a conventional waterfall shrink tunnel with a contact temperature of 195° C. The survival rate is calculated as the percentage of packages maintaining vacuum after discharge from the shrink tunnel.

The invention is described further in the following examples:

EXAMPLE I

Multilayer films were prepared by coextruding the film layers through a tubular die into a primary tube and then biaxially stretching the tube in accordance with a conventional "double-bubble" technique similar to that disclosed in U.S. Pat. No. 3,456,044 to Pahlke. The films were evaluated for shrinkage at 90° C., tensile strength, but water puncture resistance, and elongation, as well as for Loading and Shrink Tunnel Survival. Subprimal meat cuts of No. 107 beef ribs weighing 25 to 30 pounds were used in the survival test, and no boneguard pads were placed on the exposed ends of the rib bones before the meat cuts were inserted into the test bags. The films of this Example I were not irradiated.

The film composition and structure of the five samples of this example and the sample properties are shown in Table I. Under the column heading "Film Structure", the first composition is the first outer layer (the bag inner layer), the second composition is the first core layer (the barrier layer), the next composition is the second core layer comprising a polyurethane, and the last composition is the second outer layer (the bag The data in Table I show that all of the four-layer films have hot water puncture resistance values, as well as Loading and Shrink Tunnel Survival rates, which are better than the three-layer control film (EVA/PVDC/EVA), which is a conventional film currently made into bags and widely used commercially in red meat packaging. It should also be noted that Sample No. 2 is a film which falls within the scope of the prior art as taught in U.S. Pat. No. 4,348,437.

The data in Table I also show that the four-layer films of this invention, Samples No. 4 and 5, containing LLDPE (linear low density polyethylene) in the second outer layer have unexpectedly high Loading and Shrink Tunnel Survival rates of 80%, while those prior art four-layer films containing ethylene-vinyl acetate copolymer (Sample No. 2) or Surlyn Ionomer (Sample No. 3) in the second outer layer have very low survival rates of 45% and 30%, respectively, which are unacceptable in the packaging of primal and subprimal meat cuts. It should be noted that Samples No. 2, 3 and 4 only differ in the composition of the second outer layer, and thus may be directly compared. Sample No. 5 included 15 wt. % of high density polyethylene in the first outer layer and it demonstrated a substantially higher puncture resistance than was found for Sample No. 4. It should be noted that no bonewrap was used in the film evaluation of this example. Thus, the Loading and Shrink Tunnel Survival rates were determined under very severe test conditions.

EXAMPLE II

This example demonstrates that the biaxially stretched, irradiated four-layer multilayer films of this invention provide improved performance over the non-irradiated multilayer films.

Multilayer films were produced as in Example I. After biaxially stretching the films, some of these films were irradiated to a dosage level of 5 or 8 megarads. The multilayer films were evaluated for shrinkage at 90° C., tensile strength, elongation, and hot water puncture resistance, as well as for Loading and Shrink Tunnel Survival. Subprimal meat cuts of No. 107 beef ribs weighing 25 to 30 pounds were used in the survival test, and no boneguard pads were placed on the exposed ends of the rib bones before the meat cuts were inserted into the test bags. The structures and properties of the films are shown in Table II.

TABLE II

PROPERTIES OF IRRADIATED FOUR-LAYER FILMS SUITABLE FOR PACKAGING RED MEAT

| Sample No. | Film Structure | Gauge (mil) | Irradiation Dose (Mrad) | Shrinkage @ 90° C. (%) MD/TD | Tensile Strength (psi) MD/TD | Elongation At Break (%) MD/TD | Hot Water Puncture (sec) | Loading and Shrink Tunnel Survival (%) |
|---|---|---|---|---|---|---|---|---|
| 1 | EVA 1/PVDC/EVA 2 (control) | 2.4 | 0 | 40/50 | 8000/9000 | 200/190 | <1 | 10 |
| 2 | EVA 3/PVDC/80% PUR &/EVA 2 20% EVA 5 | 3.6 | 0 | 33/39 | 6900/6500 | 235/160 | N/A | 10 |
| 6 | 70% EVA 3 &/PVDC/80% PUR &/LLDPE 30% HDPE 20% EVA 5 | 3.6 | 0 | 18/23 | 7200/7900 | 295/220 | <5 | 67 |
| 7 | 70% EVA 3 &/PVDC/80% PUR &/LLDPE 30% HDPE 20% EVA 5 | 3.6 | 5 | 19/24 | 7100/7700 | 260/210 | 7 | 92 |
| 8 | 70% EVA 3 &/PVDC/80% PUR &/LLDPE 30% HDPE 20% EVA 5 | 3.6 | 8 | 16/21 | 6800/7300 | 235/195 | 11 | N/A |
| 9 | EVA 4/PVDC/80% PUR &/LLPD 20% EVA 5 | 3.4 | 5 | 25/31 | 7400/7200 | 240/200 | 5 | 75 |
| 10 | 70% EVA 3 &/PVDC/80% PUR &/ 30% HDPE 20% EVA 5 85% LLDPE & 15% HDPE | 3.6 | 5 | 15/20 | 6500/7400 | 255/220 | 6 | 79 |

The data in Table II show that the prior art three-layer control film of Sample No. 1 (EVA/PVDC/EVA) survived for less than 1 second in the Hot Water Puncture Test. The data also show that although the four-layer non-irradiated film, Sample No. 6, had better Hot Water Puncture Test survival than the control three-layer film, Sample No. 1, its survival was still below 5 seconds. Irradiating the film of Sample No. 6 to 6 megarads (Sample No. 7) and the film of Sample No. 6 to 8 megards (Sample No. 8) increased the Hot Water Puncture survival to 7 to 11 seconds, respectively.

Irradiating the film of Sample No. 9 and film of Sample No. 10 to 5 megarads also provided these films with a survival of 5 seconds or more in the Hot Water Puncture Test.

The data in Table II also show that the irradiated films of Samples No. 7, 8, 9 and 10 had better overall performance than the non-irradiated four layer films of Samples No. 2 and 6 and the non-irradiated control three-layer film of Sample No. 1. This is indicated by the results of the Hot Water Puncture Test and the Loading And Shrink Tunnel Survival Test. Among the four irradiated film samples, those of Samples No. 8, 9 and 10 represent preferred embodiments of this invention, but the film of Sample No. 7 represents the best embodiment of this invention presently known to Applicants, since it showed a 92% survival rate.

It should be noted that the "Hot Water Puncture" test data in Table I of Example I should not be directly compared with that of Table II in Example II, because the tests done in Example I were conducted with the use of a rounded wooden probe while the tests done in Example II were conducted with the use of a sharp metal probe. Thus, the values shown in Table I are all much higher than the values shown in Table II, since the metal probe of Example II provides a more severe test condition.

In the summary, the novel film compositions of this invention have been shown to possess improved physical properties which make them suitable for use in bags for packaging. In particular, the films of this invention provide bags having improved performance characteristics in the packaging of primal and subprimal meat cuts. The bags provide the desired heat-shrinking and heat-sealing characteristics with improved toughness properties. In particular, the bags have improved abrasion resistance and improved puncture resistance.

Although preferred embodiments of this invention have been described in detail, it is contemplated that modifications thereof may be made, and that some preferred features may be employed without others, all with the spirit and scope of the broad invention. For example, although polyvinylidene chloride copolymers are employed in the examples as the film of the barrier layer, other barrier films as disclosed herein may be employed therefor. Additionally, although four-layer films are illustrated in the examples, multilayer films having more than four layers are contemplated within the scope of this invention. Furthermore, those skilled in the art will recognize that the multilayer films of this invention may contain conventional additives such as pigments, antiblock agents, slip agents, etc.

What is claimed is:

1. A multilayer film suitable for use in packaging primal meat cuts, said film comprising a first outer layer comprising an ethylene-vinyl acetate copolymer, a first core layer comprising an oxygen barrier film, a second core layer comprising polyurethane, and a second outer layer comprising a linear lower density polyethylene.

2. A multilayer film in accordance with claim 1, wherein said first outer layer comprises a blend of said ethylene-vinyl acetate copolymer and a high density polyethylene.

3. A multilayer film in accordance with claim 1, wherein said first outer layer comprises an ethylene-vinyl acetate copolymer having a vinyl acetate content of from about 2 percent to about 12 percent, based on the weight of said copolymer, and a melt index of from about 0.1 to about 1.0 decigram per minute.

4. A multilayer film in accordance with claim 2, wherein said ethylene-vinyl acetate copolymer has a vinyl acetate content of from about 2 percent to about 12 percent, based on the weight of said copolymer, and a melt index of from about 0.1 to about 1.0 decigram per minute.

5. A multilayer film in accordance with claim 2, wherein said high density polyethylene has a melt index of from about 0.1 to about 1.0 decigram per minute and a density of from about 0.94 to about 0.96 gram per cubic centimeter.

6. A multilayer film in accordance with claim 2, wherein said ethylene-vinyl acetate copolymer has a vinyl acetate content of from about 2 percent to about 8 percent, based on the weight of said copolymer, and a melt index of from about 0.1 to about 1.0 decigram per minute; and said high density polyethylene has a melt index of from about 0.1 to about 1.0 decigram per minute and a density of from about 0.94 to about 0.96 gram per cubic centimeter.

7. A multilayer film in accordance with claim 2, wherein said blend comprises said ethylenevinyl acetate copolymer and up to about 30 weight percent of said high density polyethylene, based on the weight of the blend.

8. A multilayer film in accordance with claim 7, wherein said ethylene-vinyl acetate copolymer has a vinyl acetate content of from about 2 percent to about 12 percent based on the weight of the copolymer, and a melt index of from about 0.1 to about 1.0 decigram per minute.

9. A multilayer film in accordance with claim 7, wherein said high density polyethylene has a melt index of from about 0.1 to about 1.0 decigram per minute and a density of from about 0.94 to about 0.96 gram per cubic centimeter.

10. A multilayer film in accordance with claim 7, wherein said ethylene-vinyl acetate copolymer has a vinyl acetate content of from about 2 percent to about 8 percent base on the weight of said copolymer, and a melt index of from about 0.1 to about 1.0 decigram per minute, and said high density polyethylene has a melt index of from about 0.1 to about 1.0 decigram per minute and a density of from about 0.94 to about 0.96 gram per cubic centimeter.

11. A multilayer film in accordance with claim 1, wherein said first core layer is selected from the group consisting of (1) a vinylidene chloride-vinyl chloride copolymer, (2) a vinylidene chloride-methyl acrylate copolymer, and (3) an ethylene-vinyl alcohol copolymer.

12. A multilayer film in accordance with claim 11, wherein said vinylidene chloride-vinyl chloride copolymer has a vinylidene chloride content of from about 65 to about 95 weight percent and a vinyl chloride content of from about 5 to about 35 weight percent, based on the weight of said copolymer.

13. A multilayer film in accordance with claim 11, wherein said vinylidene chloride-methyl acrylate copolymer has a vinylidene chloride content of from about 85 to about 95 weight percent and a methyl acrylate content of from about 5 to about 15 weight percent, based on the weight of said copolymer.

14. A multilayer film in accordance with claim 11, wherein said ethylene-vinyl alcohol copolymer has an ethylene content of from about 28 to about 48 mole percent and a vinyl alcohol content of from about 52 to about 72 mole percent.

15. A multilayer film in accordance with claim 14, wherein said ethylene-vinyl alcohol copolymer has a saponification degree of at least about 96 percent.

16. A multilayer film in accordance with claim 1, wherein said second core layer comprises a polyurethane having a Shore A hardness of from about 75 to about 90.

17. A multilayer film in accordance with claim 1, wherein said second core layer comprises a blend of a polyurethane and up to about 40 weight percent of an ethylene-vinyl acetate copolymer, based on the weight of said blend.

18. A multilayer film in accordance with claim 17, wherein said polyurethane has a Shore A hardness of from about 75 to about 90; and said ethylene-vinyl acetate copolymer has a vinyl acetate content of from about 12 to about 50 weight percent, based on the weight of said ethylene-vinyl acetate copolymer, and a melt index of from about 0.5 to about 40 decigrams per minute.

19. A multilayer film in accordance with claim 1, wherein said second outer layer comprises a linear low density polyethylene having a melt index of from about 0.5 to about 2.0 decigrams per minute and a density of from about 0.88 to about 0.93 gram per cubic centimeter.

20. A multilayer film in accordance with claim 1, wherein said second outer layer comprises a blend of a linear low density polyethylene and up to about 30 weight percent of a high density polyethylene, based on the weight of said blend.

21. A multilayer film in accordance with claim 20, wherein said linear low density polyethylene has a melt index of from about 0.5 to about 2.0 decigrams per minute and a density of from about 0.88 to about 0.93 gram per cubic centimeter.

22. A multilayer film in accordance with claim 20, wherein said high density polyethylene has a melt index of from about 0.1 to about 1.0 decigram per minute and a density of from about 0.94 to about 0.96 gram per cubic centimeter.

23. A multilayer film in accordance with claim 1, wherein said first outer layer comprises an ethylene-vinyl acetate copolymer having a vinyl acetate content of from about 2 percent to about 12 percent, based on the weight of said copolymer, and a melt index of from about 0.1 to about 1.0 decigram per minute; said first core layer comprises a barrier material selected from the group consisting of (1) a vinylidene chloride-vinyl chloride copolymer having a vinylidene chloride content of from about 65 to about 95 weight percent, and a vinyl chloride content of from about 5 to about 35 weight percent, based on the weight of said copolymer, (2) a vinylidene chloride-methyl acrylate copolymer having a vinylidene chloride content of from about 85 to about 95 weight percent and a methyl acrylate content of from about 5 to about 15 weight percent, based on the weight of said copolymer, and (3) an ethylene-vinyl alcohol copolymer having an ethylene content of from about 28 to about 48 mole percent and a vinyl alcohol content of from about 52 to about 72 mole percent, and a saponification degree of at least about 96 percent; said second core layer comprises a polyurethane having a Shore A hardness of from about 75 to about 90; and said second outer layer comprises a linear low density polyethylene having a melt index of from about 0.5 to about 2.0 decigrams per minute and a density of from about 0.88 to about 0.93 gram per cubic centimeter.

24. A multilayer film in accordance with claim 1, wherein said film is a biaxially stretched film.

25. A multilayer film in accordance with claim 1, wherein said film has been irradiated to a dosage level of from about 3 to about 8 megarads.

26. A multilayer film in accordance with claim 1, wherein said film has been biaxially stretched and then irradiated to a dosage level of from about 3 to about 8 megarads.

27. A multilayer film in accordance with claim 1, wherein said film has been irradiated to a dosage level of from about 3 to about 8 megarads and then biaxially stretched.

28. A multilayer film in accordance with claim 1, wherein said film has a thickness of from about 3 mils to about 4 mils.

29. A multilayer film in accordance with claim 1, wherein said film is in the form of a bag.

30. A process for producing a multilayer film suitable for packaging primal meat cuts, which comprises the extrusion of a first outer layer comprising an ethylene-vinyl acetate copolymer, a first core layer comprising an oxygen barrier material, a second core layer comprising a polyurethane, and a second outer layer comprising a linear low density polyethylene.

31. A process in accordance with claim 30, wherein said first outer layer comprises a blend of said ethylene-vinyl acetate copolymer and a high density polyethylene.

32. A process in accordance with claim 30, wherein said first outer layer comprises an ethylene-vinyl acetate copolymer having a vinyl acetate content of from about 2 percent to about 12 percent, based on the weight of said copolymer, and a melt index of from about 0.1 to about 1.0 decigram per minute.

33. A process in accordance with claim 31, wherein said ethylene-vinyl acetate copolymer has a vinyl acetate content of from about 2 percent to about 12 percent, based on the weight of said copolymer, and a melt index of from about 0.1 to about 1.0 decigram per minute.

34. A process in accordance with claim 31, wherein said high density polyethylene has a melt index of from about 0.1 to about 1.0 decigram per minute and a density of from about 0.94 to about 0.96 gram per cubic centimeter.

35. A process in accordance with claim 31, wherein said ethylene-vinyl acetate copolymer has a vinyl acetate content of from about 2 percent to about 8 percent, based on the weight of said copolymer, and a melt index of from about 0.1 to about 1.0 decigram per minute; and said high density polyethylene has a melt index of from about 0.1 to about 1.0 decigram per minute and a density of from about 0.94 to about 0.96 gram per cubic centimeter.

36. A process in accordance with claim 31, wherein said blend comprises said ethylene-vinyl acetate copolymer and up to about 30 weight percent of said high density polyethylene, based on the weight of the blend.

37. A process in accordance with claim 36, wherein said ethylene-vinyl acetate copolymer has a vinyl acetate content of from about 2 percent to about 12 percent based on the weight of the copolymer, and a melt index of from about 0.1 to about 1.0 decigram per minute.

38. A process in accordance with claim 36, wherein said high density polyethylene has a melt index of from about 0.1 to about 1.0 decigram per minute and a density of from about 0.94 to about 0.96 gram per cubic centimeter.

39. A process in accordance with claim 36, wherein said ethylene-vinyl acetate copolymer has a vinyl acetate content of from about 2 percent to about 8 percent based on the weight of said copolymer, and a melt index of from about 0.1 to about 1.0 decigram per minute, and said high density polyethylene has a melt index of from about 0.1 to about 1.0 decigram per minute and a density of from about 0.94 to about 0.96 gram per cubic centimeter.

40. A process in accordance with claim 30, wherein said first core layer is selected from the group consisting of (1) a vinylidene chloride-vinyl chloride copolymer, (2) a vinylidene chloride-methyl acrylate copolymer, and (3) and ethylene-vinyl alcohol copolymer.

41. A process in accordance with claim 40, wherein said vinylidene chloride-vinyl chloride copolymer has a vinylidene chloride content of from about 65 to about 95 weight percent and a vinyl chloride content of from about 5 to about 35 weight percent, based on the weight of said copolymer.

42. A process in accordance with claim 40, wherein said vinylidene chloride-methyl acrylate copolymer has a vinylidene chloride content of from about 85 to about 95 weight percent and a methyl acrylate content of from about 5 to about 15 weight percent, based on the weight of said copolymer.

43. A process in accordance with claim 40, wherein said ethylene-vinyl alcohol copolymer has an ethylene content of from about 28 to about 48 mole percent and a vinyl alcohol content of from about 52 to about 72 mole percent.

44. A process in accordance with claim 43, wherein said ethylene-vinyl alcohol copolymer has a saponification degree of at least about 96 percent.

45. A process in accordance with claim 30, wherein said second core layer comprises a polyurethane having a Shore A hardness of from about 75 to about 90.

46. A process in accordance with claim 30, wherein said second core layer comprises a blend of a polyurethane and up to about 40 weight percent of an ethylene-vinyl acetate copolymer, based on the weight of said blend.

47. A process in accordance with claim 46, wherein said polyurethane has a Shore A hardness of from about 75 to about 90; and said ethylene-vinyl acetate copolymer has a vinyl acetate content of from about 12 to about 50 weight percent, based on the weight of said ethylene-vinyl acetate copolymer, and a melt index of from about 0.5 to about 40 decigrams per minute.

48. A process in accordance with claim 30, wherein said second outer layer comprises a linear low density polyethylene having a melt index of from about 0.5 to about 2.0 decigrams per minute and a density of from about 0.88 to about 0.93 gram per cubic centimeter.

49. A process in accordance with claim 30, wherein said second outer layer comprises a blend of a linear low density polyethylene and up to about 30 weight percent of a high density polyethylene, based on the weight of said blend.

50. A process in accordance with claim 49, wherein said linear low density polyethylene has a melt index of from about 0.5 to about 2.0 decigrams per minute and a density of from about 0.88 to about 0.93 gram per cubic centimeter.

51. A process in accordance with claim 49, wherein said high density polyethylene has a melt index of from about 0.1 to about 1.0 decigram per minute and a density of from about 0.94 to about 0.96 gram per cubic centimeter.

52. A process in accordance with claim 30, wherein said first outer layer comprises an ethylene-vinyl acetate copolymer having a vinyl acetate content of from about 2 percent to about 12 percent, based on the weight of said copolymer, and a melt index of from about 0.1 to about 1.0 decigram per minute; said first core layer comprises a barrier material selected from the group consisting of (1) a vinylidene chloride-vinyl chloride copolymer having a vinylidene chloride content of from about 65 to about 95 weight percent and a vinyl chloride content of from about 5 to about 35 weight percent, based on the weight of said copolymer, (2) a vinylidene chloride-methyl acrylate copolymer having a vinylidene chloride content of from about 85 to about 95 weight percent and a methyl acrylate content of from about 5 to about 15 weight percent, based on the weight of said copolymer, and (3) an ethylene-vinyl alcohol copolymer having an ethylene content of from about 28 to about 48 mole percent and a vinyl alcohol content of from about 52 to about 72 mole percent, and a saponification degree of at least about 96 percent; said second core layer comprises a polyurethane having a Shore A hardness of from about 75 to about 90; and said second outer layer comprises a linear low density polyethylene having a melt index of from about 0.5 to about 2.0 decigrams per minute and a density of from about 0.88 to about 0.93 grams per cubic centimeter.

53. A process in accordance with claim 30, including the step of biaxially stretching said film.

54. A process in accordance with claim 30, including the step of lubricating said film to a dosage level of from about 3 to about 8 megarads.

55. A process in accordance with claim 30, including the steps of biaxially stretching said film, and then irradiating said film to a dosage level of from about 3 to about 8 megarads.

56. A process in accordance with claim 55, including the step of fabricating said film into a bag.

57. A process in accordance with claim 30, including the steps of irradiating said film to a dosage level of from about 3 to about 8 megarads, and then biaxially stretching said film.

58. A process in accordance with claim 57, including the step of fabricating said film into a bag.

59. A process in accordance with claim 30, including the step of fabricating said film into a bag.

60. A process in accordance with claim 30, wherein said extrusion produces a coextruded multilayer tubular film.

61. A process in accordance with claim 30, wherein said extrusion produces a slot cast multilayer sheet.

62. A process in accordance with claim 30, wherein said extrusion includes the steps of extruding said first outer layer as a base tube and extrusion coating succeeding layers thereon to produce a multilayer tubular film.

* * * * *

UNITED STATES PATENT AND TRADEMARK OFFICE
CERTIFICATE OF CORRECTION

PATENT NO. : 4,828,891

DATED : May 9, 1989

INVENTOR(S) : Stanley Lustig, Jeffrey Michael Schuetz and Stephen James Vicik

It is certified that error appears in the above-identified patent and that said Letters Patent is hereby corrected as shown below:

```
In col. 2, line 64, change "layeer" to --layer--.
In col. 4, line 36, change "barrieer" to --barrier--.
In col. 5, line 1, change "conteent" to --content--.
In col. 6, line 13, change "anbout" to --about--.
In col. 7, line 21, change "discoloratin" to --discoloration--.
In col. 9, lines 40-41, change "195°C." to --195°F.--.
In col. 11, line 35, change "6 megarads" to --5 megarads--.
In col. 11, line 36, change "megards" to --megarads--.
In col. 11, line 37, change "7 to 11" to --7 and 11--.
In claim 1, line 6, change "lower" to --low--.
IN claim 54, line 2, change "lubricating" to --irradiating--.
```

Signed and Sealed this

Eighth Day of May, 1990

*Attest:*

HARRY F. MANBECK, JR.

*Attesting Officer*    *Commissioner of Patents and Trademarks*